June 7, 1949.  H. J. DAVID ET AL  2,472,407
FOLDING CART
Filed Aug. 23, 1946
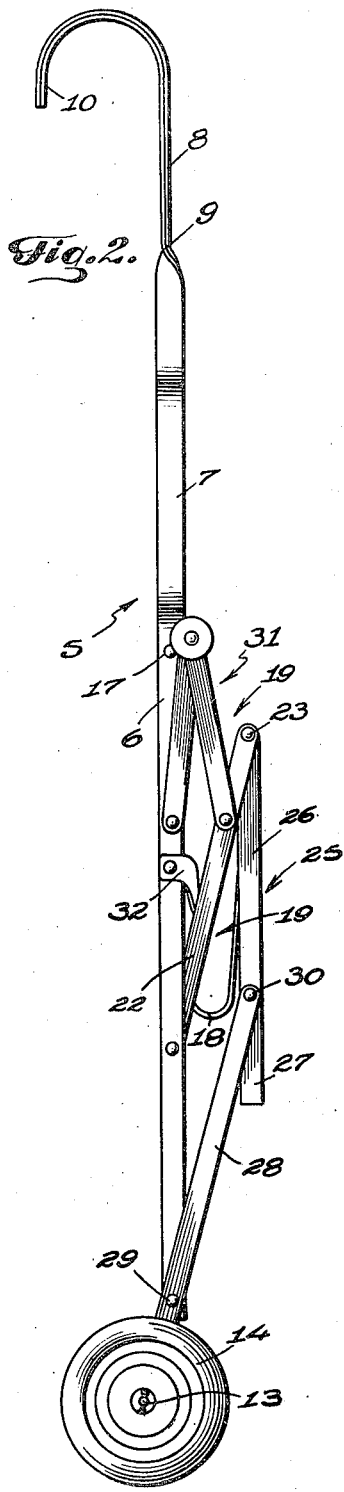
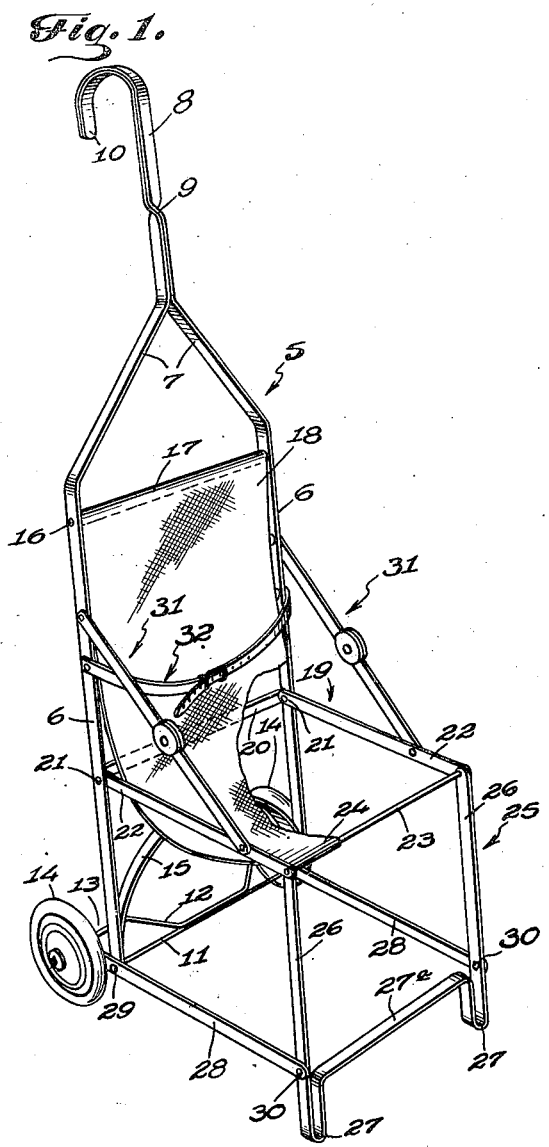
Inventors
*Herbert J. David
and Max Zausner*
By *Clarence A. O'Brien
and Harvey B. Jacobson*
Attorneys Patented June 7, 1949

2,472,407

UNITED STATES PATENT OFFICE 2,472,407

FOLDING CART

Herbert J. David, Rockaway Beach, and
Max Zausner, Brooklyn, N. Y.

Application August 23, 1946, Serial No. 692,634

4 Claims. (Cl. 280—36)

This invention relates to a novel and improved folding cart which is expressly, but not necessarily, adapted to be used as a go-cart or perambulator for babies, the construction thereof being such as to permit the same to be used, not only as a go-cart, but also as a wheelable carrier for packages, groceries and the like.

In carrying out the structural and functional principles of the preferred embodiment of the invention we have evolved and produced a light-weight two-wheeled baby cart which may be folded into compact form for expeditious handling and transportation to a point wherever necessary or desired for use.

Although the cart is primarily devised with the thought in mind of use at bathing beaches and similar resorts it is, in every sense of the word, a practical and feasible structure for use in and around the home and wherever such carts are customarily employed.

Another object of the invention is to provide the trade and user with a small readily portable flat folding cart which, when folded, packs easily for shipping and handling particularly in limited space and quarters.

A further object of the invention has to do with a cart construction which is sturdy, safe, well-balanced, appealing to the eye, easy to handle, inexpensive and which is a boon to mothers and a comfort to the child.

Other objects, features and advantages will become more readily apparent from the following description of the accompanying illustrative drawings.

In the drawings, wherein like numerals are employed to designate like parts throughout the views:

Figure 1 is a perspective view illustrating a folding cart constructed in accordance with the principles of this invention, showing the same set up for use and with portions broken away to disclose certain otherwise obscured details.

Figure 2 is a slightly enlarged side elevational view showing the manner in which the parts collapse into compact folded form for carrying and transportation purposes.

Referring now to the drawings by distinguishing reference numerals it will be seen that the principle or main frame, which is constructed of strap metal or the like, is denoted by the numeral 5, the same embodying spaced parallel frame members 6 having their upper ends converging as at 7 and with the terminals brought together in tight contact to form a shank-like handle 8, the latter part being twisted upon itself, as indicated at 9, for strength and durability and the extreme end portions of the metal are bent and fashioned into an arm hook 10. This is an important feature and comparable to the handle on an umbrella or cane and is desirable in that it facilitates hanging the cart on one's arm for convenient carrying purposes. There is a cross-rod 11 mounted between the free end portions of the frame members 6 as shown in Figure 1 and this is provided with a suitable yoke 12 whose terminal end portions 13 constitute axles for proper mounting of the small tired wheels 14. The numeral 15 designates a semi-circular brace interposed between the frame members 6 to provide desired stability and strength at this point. There is another cross-rod 16 between the upper end portions of said frame members 6 which serves not only as a brace but also as an attaching member for a hem 17 on one end of a canvas or equivalent sling 18.

Attention, at this stage, is directed to a U-shaped seat frame 19. The bight portion 20 of this is pivotally connected as at 21 between the intermediate portions of the main frame members 6. The arm portions 22 are connected at their outer ends to an assembling rod 23 which serves as an anchor for the remaining hem 24 of the sling and also as a connecting element for the leg frame 25. The arms or limbs 26 of this frame connect with the rod 23 and have their lower ends bent upon themselves as at 27 to define feet to rest on the ground or other surface. The connective or bight portion 27a serves as a convenient foot-rest. The U-frame 25 is mechanically tied to the main frame 5 by way of links 28 said links being pivoted in place at the points 29 and 30 respectively to permit proper folding of the parts. The extreme rear ends of the links 28 connect with the aforementioned wheel axles 13 for further stabilizing results.

We also employ twin-link stays 31 whose links are hinged together and are pivotally connected with the two frames 5 and 19 respectively as shown in Figure 1. Finally, we use appropriate strap means 32 to facilitate holding the baby in the seating sling.

It is submitted that the chosen parts have been carefully selected and structurally coordinated to provide an over-all assemblage which is possessed of requisite strength, durability and adaptability. It follows therefore, that a cart constructed in accordance with our ideas is ideal and aptly suited for the intended purposes.

Although the description and drawings suggest the use of the structure as a perambulator type cart for babies and small children, it is obvious that the arrangement can be slightly altered and employed as a miscellaneous package and load toting carrier.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

We claim:

1. In a folding cart of the class described, a main elongated U-shaped back frame having a handle, wheels attached to the lower end portion of said frame, a seat frame of U-shaped form having one end portion pivotally mounted between intermediate portions of the frame members of the first named frame, a third U-shaped leg frame, the arms thereof being rigid and pivotally connected to the free ends of the arms of the second named seat frame, connecting links between and connected with the first and the third named frames, and a flexible sling attached at one end to the first named frame and at the opposite end to a rod carried by interconnected portions of the second and third named frames.

2. In a folding cart of the class described, a relatively long U-shaped frame provided at one end with a handle, carting and frame-tilting wheels mounted on the lower end portion of said frame, a seat frame of U-shaped form having its bight portion pivotally mounted between the intermediate portions of the frame members of said first-named back frame, said seat frame being rigid, a third U-shaped leg frame, the arms of said leg frame being rigid and pivotally connected to the free ends of the arms of the second-named seat frame, the connective portion of said leg frame being bent to provide supporting feet and a connecting foot rest between said feet, connecting links between and connected with the first and the third-named frames, and a flexible sling attached at one end between the intermediate portions of the members of the first-named frame and attached at its opposite end to a rod carried by the interconnected portions of the second- and third-named frames.

3. In a folding cart of the class described, a relatively long main frame, said frame being U-shaped and having a handle, a cross rod interconnecting the lower end portions of the members of said U-shaped frame, a brace between said frame members coacting with said cross rod, a yoke connected with said cross rod and terminating in axles, wheels mounted for rotation on said axles, a seat frame of U-shaped form having its bight portion pivotally mounted between the intermediate portions of the members of the first-named frame, a substantially U-shaped rigid leg frame having its intermediate portion formed into a foot rest and coacting ground-contacting feet, links connected respectively with the leg frame and members of the first-named U-shaped frame, and a sling connected with said U-shaped frame and leg frame.

4. In a folding structure of the class described, a relatively long U-shaped frame provided at one end with a handle, a seat frame of U-shaped form having its bight portion pivotally mounted between the intermediate portions of the frame members of said first-named back frame, said seat frame being rigid, a third U-shaped leg frame, the arms of said leg frame being rigid and pivotally connected to the free ends of the arms of the second-named seat frame, the connective portion of said leg frame being bent to provide supporting feet and a connecting foot rest between said feet, connecting links between and connected with the first and the third-named frames, and a flexible sling attached at one end between the intermediate portions of the members of the first-named frame and attached at its opposite end to a rod carried by the interconnected portions of the second and third-named frames.

HERBERT J. DAVID.
MAX ZAUSNER.

REFERENCES CITED

The following references are of record in the file of this patent:

UNITED STATES PATENTS

| Number | Name | Date |
| --- | --- | --- |
| 1,409,280 | Brown | Mar. 14, 1922 |
| 1,718,962 | Kimball | July 2, 1929 |
| 2,061,623 | Guy | Nov. 24, 1936 |
| 2,264,121 | Pattiani | Nov. 25, 1941 |
| 2,284,801 | Conger | June 2, 1942 |